United States Patent [19]

Benzaria

[11] 4,086,162

[45] Apr. 25, 1978

[54] METHOD OF ADSORPTION BY ACTIVATED CHARCOAL IN A LOWER FLUIDIZED BED AND UPPER FIXED BED

[76] Inventor: Jacques Benzaria, 97, rue du Bas-Saut, 60230 Chambly, France

[21] Appl. No.: 696,261

[22] Filed: Jun. 16, 1976

Related U.S. Application Data

[63] Continuation of Ser. No. 517,056, Oct. 22, 1974, abandoned.

[30] Foreign Application Priority Data

Oct. 22, 1973 France .................. 73 37630

[51] Int. Cl.² .............. B01D 35/00; B01D 39/00
[52] U.S. Cl. ........................ 210/20; 210/40; 210/73 R; 55/79
[58] Field of Search ............. 210/20, 24, 73, 33, 210/189, 264, 268, 283, 284, 285, 286, 35, 39, 40, 80; 55/77, 79, 390, 99, 479

[56] References Cited

U.S. PATENT DOCUMENTS

| | | | |
|---|---|---|---|
| 2,684,931 | 7/1954 | Berg | 55/79 |
| 2,726,137 | 12/1955 | Davis | 55/79 |
| 2,745,888 | 5/1956 | Mertes et al. | 210/168 |
| 2,904,518 | 9/1959 | Shea | 210/268 |
| 3,043,771 | 10/1962 | Bloch | 210/24 |
| 3,177,631 | 3/1965 | Tamura | 55/79 |
| 3,374,052 | 3/1968 | Fan et al. | 210/20 |
| 3,420,709 | 1/1969 | Barrett | 210/39 |
| 3,455,820 | 7/1969 | Joyce et al. | 210/40 |
| 3,458,436 | 7/1969 | Martinola et al. | 210/20 |
| 3,551,118 | 12/1970 | Cluete | 210/33 |
| 3,595,385 | 7/1971 | Duff | 210/33 |
| 3,650,948 | 3/1972 | Burriat et al. | 210/33 |
| 3,680,701 | 8/1972 | Holca | 210/80 |
| 3,846,289 | 11/1974 | Jeris et al. | 210/20 |
| 3,985,648 | 10/1976 | Casolo | 210/40 |

*Primary Examiner*—Charles N. Hart
*Assistant Examiner*—Ernest G. Therkorn
*Attorney, Agent, or Firm*—Hammond & Littell

[57] ABSTRACT

The improved adsorption device comprises two superposed beds of solid adsorbent in which, during the adsorption step, the times of flow of fluid phase to be passed through the first or lower bed fluidized or semifluidized and the second or upper bed fixed or expanded are respectively in an approximate ratio of 1:10, the sections of said first and second beds (e.g., of substantially cylindrical shape) being in a ratio of about 1:10.

4 Claims, 2 Drawing Figures

METHOD OF ADSORPTION BY ACTIVATED CHARCOAL IN A LOWER FLUIDIZED BED AND UPPER FIXED BED

This is a continuation, of Ser. No. 517,056, filed Oct. 22, 1974, now abandoned.

The present invention relates to an improved adsorption device and, more particularly, a superposed-beds adsorber operating in fluid, gaseous or liquid phase. It further relates to a process for adsorbing components of a fluid phase on beds of active material, in particular, fluidized, semi-fluidized or fixed beds of active carbon.

The invention relates specifically to an adsorption cycle on granular active material, as well as ball shaped particles.

There are known numerous fluidized-bed reactors in which the gaseous or liquid phase (including one or all components participating in the reaction) introduced into the base of reactor, causes fluidifying of the solid phase (consisting of one of the components participating in the reaction or of the catalyst). Most reactors of this type are tubular and the diameter of the vertical tube, at least in the operative portion of the apparatus, is determined by the velocity of fluids in the tube which is supposed to be empty. When the diameter is established, the height of the bed is determined by the contacting time which it is desired to achieve. It is known, for example, that for obtaining an adequate fluidization, the height of the bed must be between one or two times the diameter of the latter.

It has already been proposed to remediate to cases in which the contacting time in fluidized-bed reactors is such that the height of the bed exceeds the double of diameter of the latter; such known palliatives comprise either providing several superposed beds of the same type and having substantially the same characteristics, or providing baffles within a single bed, these baffles being formed, if desired, by cooling surfaces such as pipes often introduced into the reactor perpendicularly to the flow of material.

It is further known that liquid-solid adsorption is an exothermic phenomenon and it has always been stated that when the adsorbent is operated in liquid phase, a high adsorption capacity is related to a very developed outer surface and to the polarity of this surface; and also, in the adsorption phase, an increase of temperature is observed.

It has now been found that, in an adsorption device in liquid phase, there happens in reality a practically-instantaneous release of heat produced by about 80% of available or useful area of solid absorbent.

There has been devised an improved adsorption device for treating liquids, wherein at least 2 beds of solid adsorbent are superposed, the throughflow speed of fluid to be processed through the first or lower bed being about 1 to 10 times that of the fluid in the second or upper bed.

The invention has for its object to provide an improved adsorption-desorption device for treating fluids, characterized in that it comprises 2 superposed beds of solid adsorbent in which, during the adsorption step, the times of flow of fluid phase to be passed through the first or lower bed and the second or upper bed are respectively in an approximate ratio of 1:10 and preferably of about 1:5, the sections of said first and second beds, e.g. of substantially cylindrical shape, being in a ratio of about 1:10 and, preferably, of about 1:4.

The mass of solid adsorbent is preferably distributed substantially by halves between the first and the second beds. Such distribution is however not critical and one may prefer another suitable distribution taking into consideration the proposed application.

According to the invention, the passage speed of fluid phase through the first bed is from 5 to 50 m/hr.

Such values can be accordingly much above conventional speeds in usual fluidized beds wherein the speed of fluidization varies from 10 to 15 m/hr in case of active carbon.

The speed of passage of fluid phase through the upper or second bed is, according to the invention, of 1 to 10 times said passage speed of fluid phase to be treated in the first bed of solid particles.

In the adsorption device of the invention, the first or lower bed is fluidized or semi-fluidized, whereas the second or upper bed is a bed which, according to the speed of flow of fluid phase, is a substantially fixed bed or a merely expanded bed.

According to a prefered embodiment of the adsorber of the invention, the lower bed is fluidized whereas the upper bed is fixed or expanded during the adsorption step.

The superposed-beds adsorber, according to the invention, can be packed with any suitable solid granular material, e.g. active carbon, alumina or adsorbent materials.

The size of particles of said granular material is not critical. Moreover the used material is substantially never formed of grains having homogeneous sizes and a wide particle-size distribution is the most current arrangement. However, those skilled in the art are aware that for usual granular materials, the diameter of the finest particles must not be smaller than the tenth of the average diameter of particulated material load.

In both parts of adsorber, there is provided, above the granular material layer, a decanting zone of sufficient height.

Both parts of the adsorber, corresponding respectively to the lower and the upper particle beds, are preferably interconnected through a hydraulic cone or hydraulic protector. Preferably, the adsorber of the invention comprises a hydraulic cone of 60° angle, within which are formed triangular partitions, the base of which corresponds to diameter of the upper bed while the apex thereof enters into the lower bed.

A number of partitions may be 2 but this figure is not limitative and a good distribution is obtained with 4 partitions.

This device is adapted to harmonize fluidization at the level of both layers of the adsorber.

It has to be noted that the superposed-bed adsorption device of the invention comprises, in the case of the lower bed, some or all of the conventional elements found in known fluidized-bed adsorbers, i.e.: a support bars or plate, fluid-input means, means for introducing fresh granular material and means for extracting when necessary granular material for regeneration, as well as means providing for the fluidization of the bed, the flow of washing or regeneration fluids, etc.

A further object of the invention is to provide a process for adsorption of components of a fluid on beds of active material, which comprises passing in the adsorption step the fluid phase to be treated through a first or lower bed at a speed of about 5 to 50 m/hr for liquids and thereafter passing the fluid phase exiting from said first bed through a second or upper bed superposed and connected to the first bed, at a speed within a ratio of 1:10 with respect to the speed in the first bed, the sections of said first and second beds, preferably substantially cylindrical, being in a ratio of about 1:10 and, preferably about 1:4.

Without wishing tying the invention to any theory, it is believed that the outstanding efficiency of the process and the novel device of the invention is due to a first high-speed adsorption stage using up to 80% of effective area of granular adsorption material, within a first bed and a second slower adsorption stage in a second bed of adsorbent granular material superposed to the first.

Other features and advantages of the invention will become clear upon reading the following descriptin taken in consideration with the appended drawings, in which.

The adsorption-desorption column 1 comprises a tube 2 having a cross-section $S_A$ and a tube 3 having a cross-section $S_B$ interconnected by a hydraulic cone 4. A bars 5 bears the active carbon in the lower tube 2. The fluid to be processed is admitted at 6 and the extraction is effected at 7 during adsorption.

Figure 1:
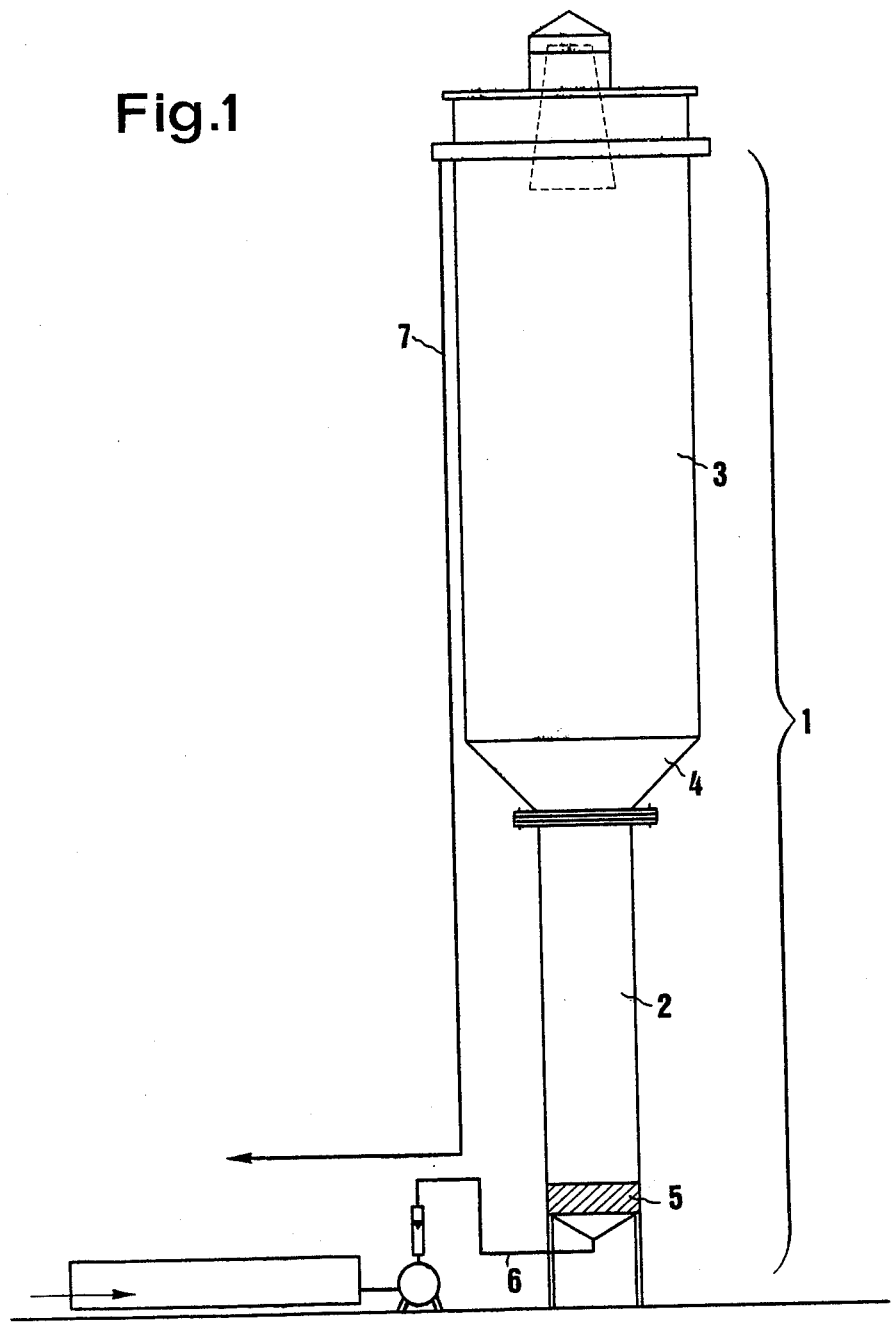
FIG. 1 is a diagrammatic cross-sectional view of a device of the invention.
Figure 2:
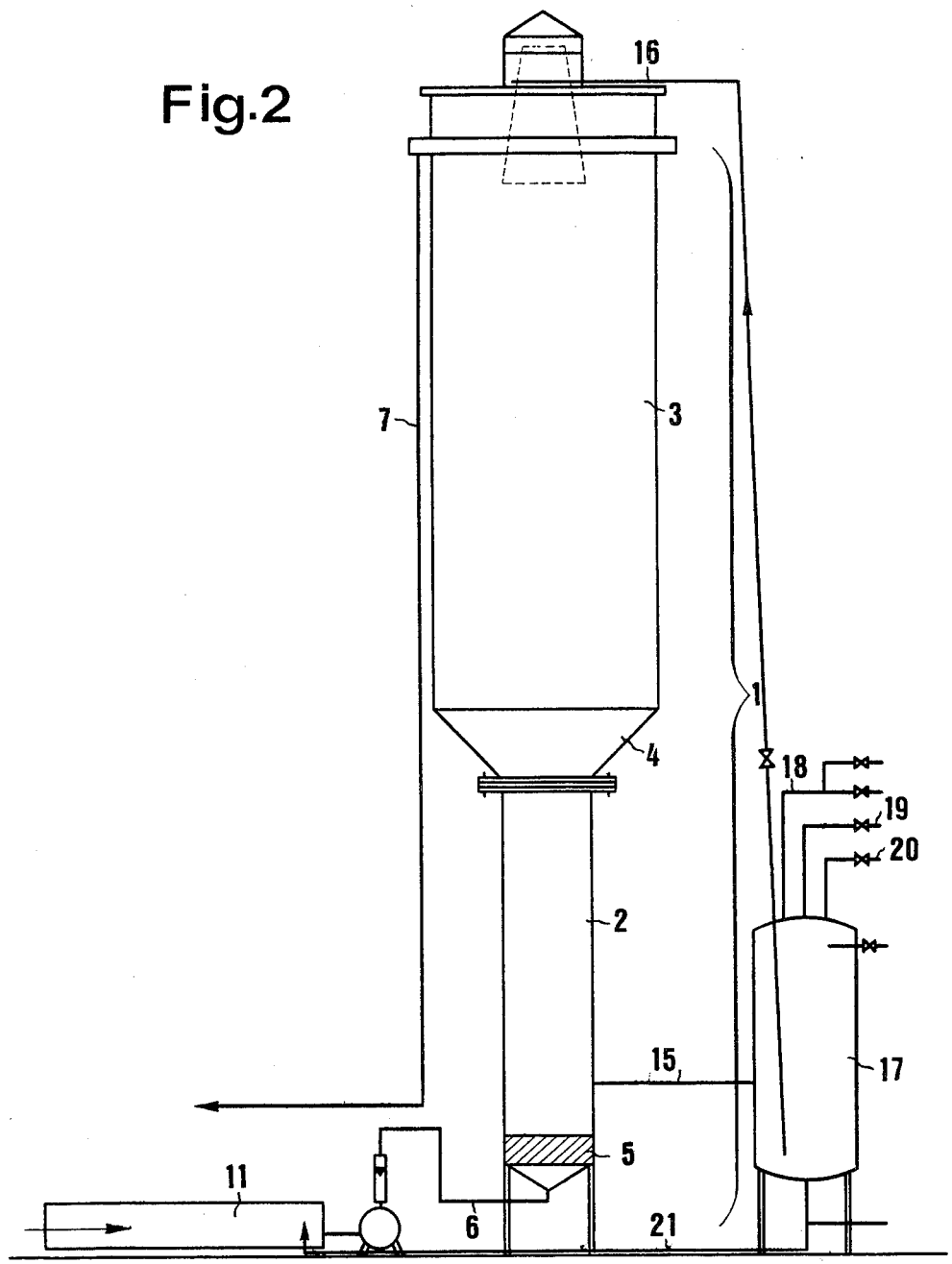
FIG. 2 is diagrammatic cross-sectional view of the entire installation having said device and its accessories integrated therein.

In FIG. 2, column 1 is fed with fluid from a tank 11 by means of a pump 12 and pipe 6, the treated fluid being removed at the top of the column through the pipe 7 (left portion of the figure). For regeneration, the process is carried out discontinuously. The adsorbent material can be regenerated by any means, including a thermic regeneration furnace. The extraction of saturated granular material is effected through pipe 15 (right portion of the figure) either continuously or discontinuously, while fresh granular material is fed at 16 from regenerator 17. Said regenerator 17 is supplied at 18 with steam and reactant, at 19 with water and at 20 with air. The regeneration products, inter alia, are extracted through the bottom of regenerator 17.

The invention will now be illustrated by the following detailed non-limitative examples:

EXAMPLE 1

A containing nitrophenol solution to be purified containing 6 g/liter of secondary derivatives has been treated in an adsorption device of the invention. The two beds adsorber system consisted of a metal tower comprising two superposed portions, the cross-sections of which were respectively $S_A = 10$ cm$^2$ for the lower portion and $S_B = 50$ cm$^2$ for the upper portion, interconnected by a hydraulic cone and the adsorbent component of which was activated carbon of average particle size from 0.2 to 3 mm; the volume of the latter was such as to correspond to 3 times the volume of hourly throughput of solution to be processed the mass of said carbon being divided by halves between the lower bed and the upper bed.

The fluid velocity was 10–50 m/hr in the lower bed and 2–6 m/hr in the upper bed.

After a single passage of the stipulated nitrophenol solution through the adsorption system of the invention, there has been collected at the head of adsorber column a solution showing 0% of nitrophenols by titration.

EXAMPLE 2

In an adsorption device according to the invention, there has been treated drilling water having a turbidity corresponding to 40 drops of mastic and containing products such as humic acid, algae and traces of clay (the total of organic materials corresponded to a DCO value of 20 mg/l). The two beds adsorber system consisted of a tower of pyrex made of two superposed portions, the cross-section $S_A$ of the lower one being 50 cm$^2$ while that of the upper section $S_B$ was 250 cm$^2$, interconnected by a hydraulic cone of 60° inclination and provided with its distributing means.

The height of the lower bed was 4 m; the height of the upper bed was 5 m.

The adsorbent material was activated carbon of particle size from 0.2 to 3 mm, having a density of 0.470 and specific area of 1000 m$^2$/g. The total volume of carbon was 130 l, the passage speed through the lower bed being 40 m/hr.

During the whole operation the exiting water (percolation of 26 m$^3$) had a turbidity of only one drop of mastic and the organic components of water were no more dosable at the exit of the second or upper bed.

It has been also noted that the traces of clay were eliminated.

Upon withdrawing lower layer corresponding to polluted carbon, it has been possible to dose in this carbon during washing thereof, a strong concentration of sludge having a content of organic material above 80% with respect to dry extract.

EXAMPLE 3

The operation was similar to that of example 1 but with supplementary injection, in the same water, of 0.1% of mixed nitrophenols and known detergent (trade name ABF 50-50 detergent). During the whole test, i.e. a percolation of 30 m$^3$ of mixture, no trace of nitrogenated compounds or detergents was detected. Accordingly the water has been correctly purified.

What we claim is:

1. A process for adsorption of components of a fluid phase on beds of activated carbon comprising passing the fluid to be treated through a lower fluidized bed of activated carbon at a rate sufficient to create a fluidized bed, upwardly passing the fluid through a junction area and then upwardly through an upper fixed bed of activated carbon at a slower rate of speed in a ratio of not more than about 1:10 with respect to the rate of the lower bed, said difference in the rate of flow being used to maintain the lower bed in fluidized form and said upper bed in fixed form and said rate of flow being controlled by the ratio of the cross-section of the lower bed to the upper bed, said ratio being 1/4 to 1/10 and recovering the treated fluid.

2. The process of claim 1 wherein the amount of activated carbon in the said beds is substantially equal.

3. The process of claim 1 wherein 80% of the adsorption is effected in the lower fluidized bed.

4. The process of claim 1 wherein the speed of the liquid in the fluidized bed is 5 to 50 m/hr.

* * * * *